United States Patent [19]

Taft

[11] Patent Number: 4,695,156
[45] Date of Patent: Sep. 22, 1987

[54] RANGE FINDING METHOD AND APPARATUS

[75] Inventor: Jeffrey D. Taft, Murrysville, Pa.

[73] Assignee: Westinghouse Electric Corp., Pittsburgh, Pa.

[21] Appl. No.: 882,006

[22] Filed: Jul. 3, 1986

[51] Int. Cl.$^4$ ............................ G01C 3/00; G01C 5/00
[52] U.S. Cl. ........................................ 356/1; 356/376; 358/107; 901/47
[58] Field of Search ................. 356/1, 2, 376, 383, 356/384; 358/107; 901/47

[56] References Cited

U.S. PATENT DOCUMENTS

| | | |
|---|---|---|
| 2,933,008 | 4/1960 | Barnett . |
| 3,566,139 | 2/1971 | Hardy . |
| 3,578,863 | 5/1971 | Farrand . |
| 3,674,369 | 7/1972 | Hobrough . |
| 3,752,580 | 8/1973 | Hardy . |
| 3,783,294 | 1/1974 | Koper ..................................... 356/2 |
| 3,811,011 | 5/1974 | Hardy et al. . |
| 3,961,851 | 6/1976 | Gerharz . |
| 4,054,782 | 10/1977 | Weibel . |
| 4,078,171 | 3/1978 | Stauffer . |
| 4,099,880 | 7/1978 | Kano . |
| 4,178,098 | 12/1979 | Asano et al. . |
| 4,189,232 | 2/1980 | Asano et al. . |
| 4,525,858 | 6/1985 | Cline et al. . |
| 4,539,701 | 9/1985 | Galbreath et al. . |
| 4,561,747 | 12/1985 | Ohno et al. . |

Primary Examiner—Stephen C. Buczinski
Attorney, Agent, or Firm—Daniel C. Abeles

[57] ABSTRACT

A range finding apparatus includes a pair of spaced apart cameras which provide signals that are digitalized, stored in frame buffers, and provided to a computer that provides a range map of a target object viewed by the cameras. The computer optimizes a disparity function by minimizing a cost functional, thereby finding the range at different points on the surface of the target object based on variations in illumination, reflectivity, and texture.

20 Claims, 14 Drawing Figures

RANGE FINDING METHOD AND APPARATUS

BACKGROUND OF THE INVENTION

The present invention relates to a method and apparatus for finding the range of a target object, and more particularly to a method and apparatus for finding the range to various points on the surface of the target object without relying upon assumptions about the shape of the object. The invention is particularly useful for ranging an object which is to be grasped by an industrial robot.

Many schemes for stereoscopically determining the range of a target object have been devised. In a typical "range finder" camera, for example, a view of the object is taken at a first position along a base line, this view is matched with another view taken at a second position along the base line, and triangulation is employed to determine the range in order to automatically set the lens. It is the photographer, of course, who matches the views, and this requires an exercise of judgment. In methods which determine range electronically, however, a problem which frequently arises is that of matching the view from one position with the view from another position. Typically this problem is solved by making assumptions about the target object. It may be treated as a point, for example, or it may be assumed to have an edge which is readily identifiable in electrical signals for both views. Such assumptions clearly limit the utility of the range finding method.

SUMMARY OF THE INVENTION

Accordingly, an object of the present invention is to provide a method and apparatus for determining the range of a target object without making unnessary assumptions about the shape, orientation, or reflectivity of the target object.

Another object of the invention is to provide a method and apparatus for determining the distance between a plane and different points on the surface of an arbitrary target object, thereby permitting construction of a range map of the object. Such a range map is particularly useful when an industrial robot is to identify and grasp an object which may not be positioned at its expected location.

Another object of the invention is to provide a method and apparatus for sensing the three-dimensional position of an object by using variations in illumination, reflectivity, and surface texture to match stereo views of the object.

These and other objects can be obtained by directing a pair of cameras toward the object, each camera having a respective sensor with light-sensitive regions that are disposed in a row. The camera signals provide information about the light intensity as a function of different positions along the respective row of light sensitive regions. In the present invention a disparity function is found which maps one signal onto the other, and this disparity function is used to determine the range at a plurality of points on the target object.

In accordance with one aspect of the invention, the disparity function is found by establishing a disparity matrix in a memory, matching peaks in the camera signals, marking the disparity matrix at a row and column corresponding to the peaks, incrementing the column, marking the incremented column at a point which lies on the disparity function, and then incrementing the column again and marking another point which lies on the disparity function. Preferably constraints are also marked in the disparity matrix each time a point is marked in a new column.

In accordance with another aspect of the present invention, after the initial point is marked in the disparity matrix, points which lie on the disparity function in other columns are determined by minimizing a cost functional. The cost functional preferably has a term that is a function of the difference between $V_A(I_A)$ and $V_B[I_A - D(I_A)]$, a term that is a function of the difference between derivatives of $V_A(I_A)$ and $V_B[I_A - D(I_A)]$, and a term that is a function of $D(I_A)$, where $V_A(I_A)$ corresponds to the signal from one camera, $V_B(I_B)$ corresponds to the signal from the second camera, $D(I_A)$ is the disparity function.

DESCRIPTION OF THE PREFERRED EMBODIMENT

Figure 1:
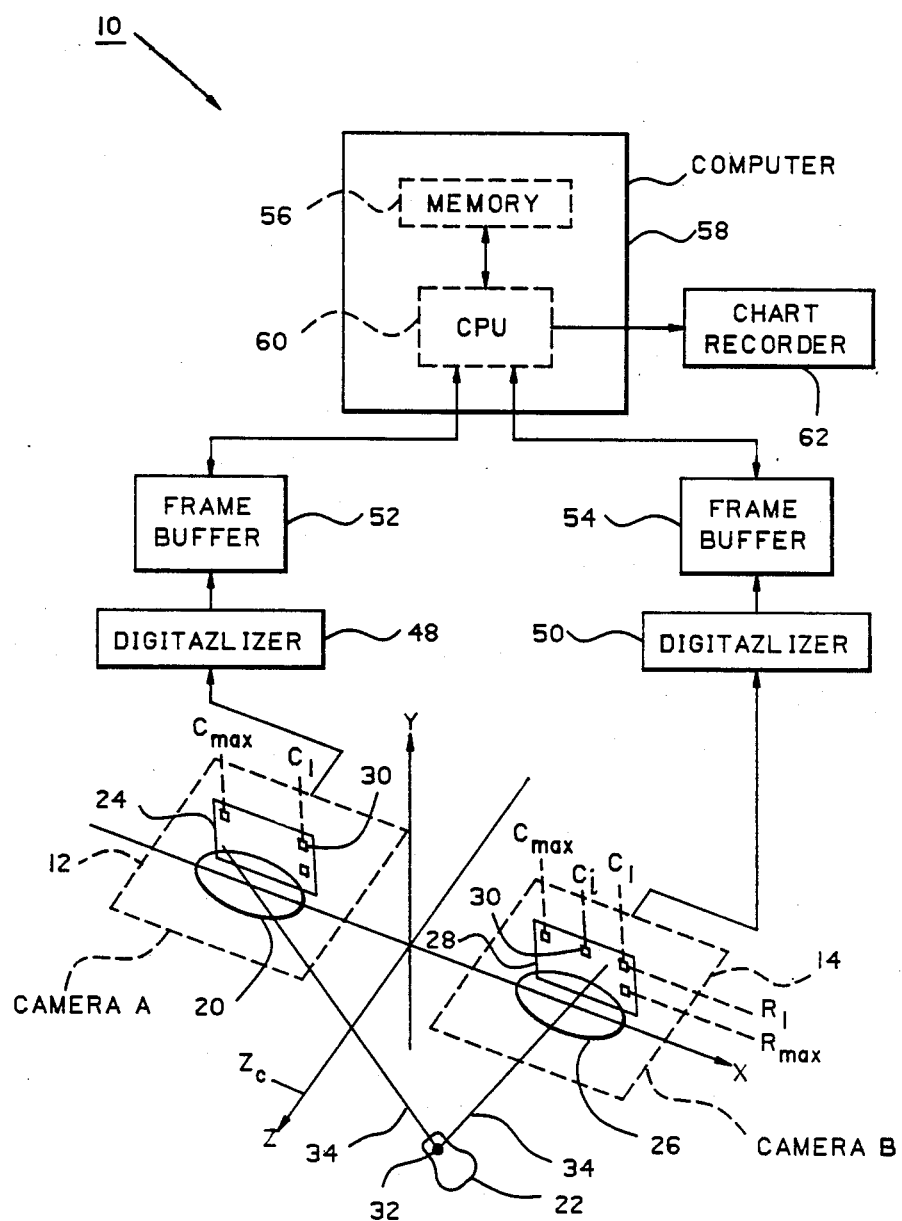
FIG. 1 is a schematic diagram, partially in perspective, illustrating an embodiment of the range finding apparatus of the present invention, and generally illustrates a pair of spaced-apart cameras for obtaining signals from a target object and electrical circuitry for processing the signals.

FIG. 1 illustrates a range finding apparatus 10, which includes a television camera A (reference number 12), a television camera B (reference number 14), and electrical circuitry which will be discussed later. Camera 12 has a lens 20 for focusing light reflected from a target object 22 onto a sensor 24 disposed at the impage plane of lens 20. Similarily, camera 14 includes a lens 26 for focusing light on a sensor 28 disposed at the image plane of lens 26. Each of sensors 24 and 28 includes an array of light sensitive regions 30 which are disposed in rows $R_1 \ldots R_{max}$ and columns $C_1 \ldots C_i \ldots C_{max}$. As is known in the art, during operation cameras 12 and 14 scan the regions 30 of one row, from column $C_1$ to column $C_{max}$, and then proceed to scan the regions 30 of subsequent rows so as to produce analog signals whose amplitude depends upon the intensity of light falling upon all of the regions 30. Regions 30 may be provided by an array of separate elements, as in a charge coupled device, they may represent different portions of a single screen that is scanned by an electron beam as in an orthicon tube, etc.

With continuing reference to FIG. 1, sensors 24 and 28 lie in a plane that is parallel to the XY plane, and point 32 on target object 22 lies an arbitrary distance $Z_c$ in front of the XY plane. When object 22 is illuminated, light reflected from point 32 is focused by lens 20 on a unique region 30 of sensor 24 and by lens 26 on a unique region 30 of sensor 28. Such focusing is illustrated in FIG. 1 by lines 34, which pass through point 32 and the optical centers of lenses 20 and 26. In FIG. 1 it will be noted that light from point 32 is focused on sensor 24 at a region 30 that is near column $C_{max}$, while the light is focused on sensor 28 at a region 30 that is closer to column $C_1$. Apparatus 10 employs this difference between the columns to find the range $Z_c$. Although this will be discussed in more detail later, several general observations of an intuitive nature can be drawn from FIG. 1. If the X and Z coordinates remained unchanged but target object 22 were moved upward by a predetermined distance along the Y axis, for each of sensors 24 and 28 light would be focused on a region 30 in a different row but the same column. If the Y and Z coordinates remained unchanged but target object 22 were moved to the right by a predetermined distance along the X axis, for each of sensors 24 and 28 light would be focused on a region 30 in the same row but at a column that is closer to $C_{max}$. Finally, if the X and Y coordinates remained unchanged but body 22 were withdrawn by a predetermined distance along the Z axis, for each of sensors 24 and 28 light would be focused on a region 30 in the same row, but the column of sensor 24 would move towards $C_1$ while the column of sensor 28 would move toward $C_{max}$. If object 22 were withdrawn to infinity, the lines 34 would be parallel and the regions 30 of sensors 24 and 28 would lie in the same column, midway between column $C_i$ and column $C_{max}$.

Figure 2A:
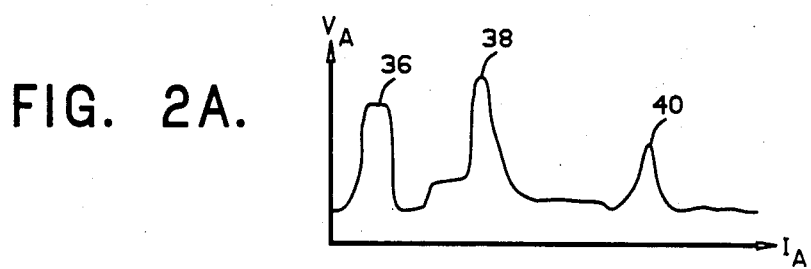
FIGS. 2A and 2B are graphs illustrating a general example of the electrical signals produced by the cameras of FIG. 1 when they are directed toward an arbitrary target object.
Figure 2B:
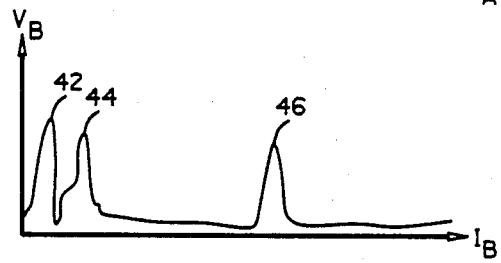

FIG. 2A schematically illustrates the signal from camera A (reference number 12) for a single scanning line, that is, for columns $C_1$ through $C_{max}$ for a single row $R_i$, when camera A is directed towards some arbitrary scene. Similarly, FIG. 2B represents the output of camera B (reference number 14) for a single scanning line when camera B is directed toward the same scene. The vertical coordinates $V_A$ and $V_B$ represent voltage, while the horizontal coordinates $I_A$ and $I_B$ represent the columns. For a region 30 in the tenth column in camera A, for example, $I_A$ would be ten and $V_A(10)$ would be proportional to the light intensity at that region 30. Since cameras A and B are assumed to be exposed to the same scene, it will be apparent that the output signals will have corresponding features. Thus an object with three very reflective regions at different ranges in the field of view would result in three peaks 36, 38, and 40 in the signal for camera A and three corresponding peaks 42, 44, and 46 in the signal for camera B. Because of the different perspectives of the cameras, however, the peaks will be shifted with respect to each other as a function of the distance $Z_c$ of the respective reflective regions. For example in FIG. 2B peak 42 is shifted leftward with respect to corresponding peak 36 of FIG. 2A and peak 44 is also shifted leftward with respect to corresponding peak 38. Moreover peak 44 is closer to peak 42 than the distance between peaks 36 and 38, and is further from peak 46 than the distance between peaks 38 and 40. In addition to such shifts, the signal voltages may differ.

Returning to FIG. 1, in addition to cameras 12 and 14 apparatus 10 includes digitalizers 48 and 50, which amplify the signals from the cameras and convert them to digital form, with the light intensity at each region 30 being divided into 256 levels and being represented by 8 bits. These digital signals are provided to frame buffers 52 and 54, each of which stores an 8 bit signal for each of the rows and columns of the respective camera. If desired buffers 52 and 54 can be part of the memory 56 of computer 58, which also includes a central processing unit 60. Computer 58 determines a range map, as will be discussed in connection with FIG. 6, and provides corresponding signals to an output device such as chart recorder 62. The output device need not be a chart recorder, of course, and in practice may be an industrial robot which employs the range map to grasp objects which have known shapes but which are disposed at varying positions and orientations.

In apparatus 10 the cameras 12 and 14 are identical and are positioned at equal distances from the YZ plane, with the sensors 24 and 28 being parallel to the XY plane and spaced at equal distance from the XY plane. Under these conditions it can be shown geometrically that:

$$Z_c = \frac{2b f I_{max}/L_x}{I_A - I_B} \quad (1)$$

In equation 1, $Z_c$ is the range from the XY plane; f is the focal length of lenses 20 and 26; b is the distance from the YZ plane to the center column of either of sensors 24 and 28, so that the center-to-center distance between sensors 24 and 28 is 2b; $I_{max}$ is an integer corresponding to the number of columns in either of sensors 24 and 28 (the sensors having an equal number of columns); and $L_X$ is the length of either of sensors 24 and 28 (the sensors having an equal length) from the first column $C_1$ to the last column $C_{max}$. If each region 30 has a width W, it will be apparent that $WI_{max}$ equal $L_x$. The terms $I_A$ and $I_B$ are integers identifying columns of cameras A and B respectively when a point on a target object is focused on regions 30 in those columns. For example if point 32 in FIG. 1 were focused on $C_{100}$ of camera A and $C_{30}$ of camera B, $I_A$ would be 100 and $I_B$ would be 30.

The denominator in equation 1, $I_A - I_B$, is known as the "disparity." It will be apparent that the range $Z_c$ is a function of the disparity. Referring again to FIG. 1, for point 32 the disparity is a constant. However for another point on the surface of target object 22 the disparity might be a different constant and, in general, the disparity (and thus the range $Z_c$) may vary over the surface of an object. Such varying ranges result in the shifts that were previously discussed with respect to FIGS. 2A and 2B.

In the present invention the disparity is represented as a function of $I_A$, as follows:

$$D(I_A) = I_A - I_B \quad (2)$$

For a given target object at a given position with respect to apparatus 10, it will be apparent that an $I_A$ is related to a corresponding $I_B$ by the disparity function. That is, the disparity function is determined by the physical situation, since the range is determined by the physical situation, but can be considered mathematically as a function which maps $I_A$ onto $I_B$ (or vice versa) in the manner ordained by the physical situation.

Figure 2C:
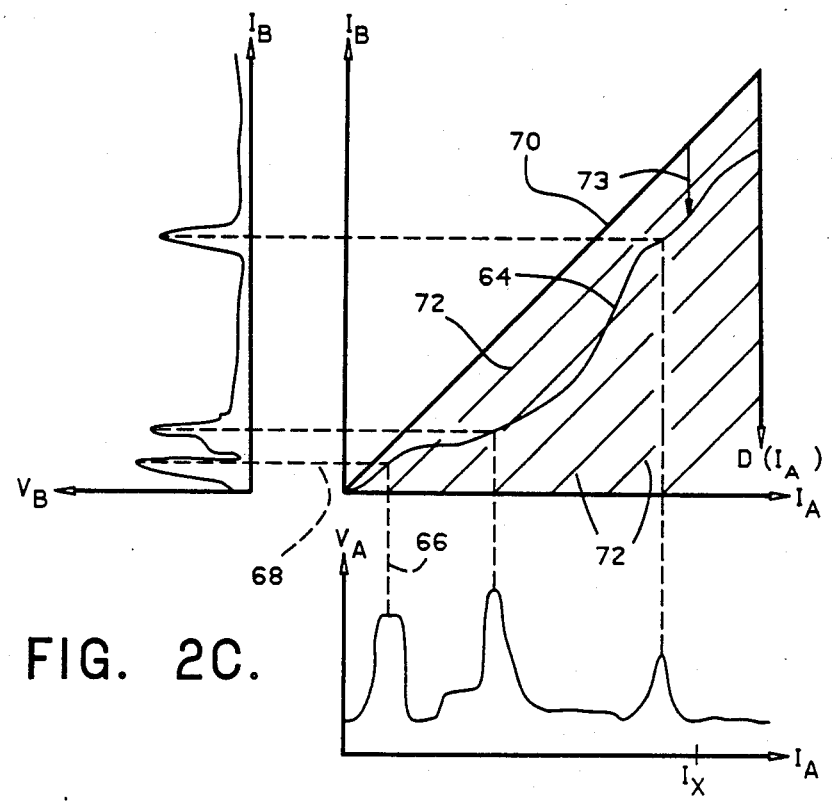
FIG. 2C is a graphic representation illustrating a disparity function which maps one of the signals of FIGS. 2A and 2B onto the other signal.

FIG. 2C graphically illustrates a disparity function, identified by reference number 64, which maps the graph of FIG. 2A onto the graph of FIG. 2B. As will be seen the vertical projection of peak 36, along dotted line 66, intersects disparity function 64 at the horizontal projection, along dotted line 68, of peak 42. Similarly, the position of peak 38 and the disparity function 64 at that peak yield $I_B$ at peak 44, etc. For each $I_A$, at least in the interval illustrated, the disparity function 64 provides a corresponding $I_B$. Physically, from equation 1 it will be apparent that the 45° line 70, where $I_A$ equals $I_B$, represents a point at infinity. Since no objects in the real universe can be beyond infinity, the disparity function 64 necessarily lies at or below the 45° line 70 for every $I_A$. The lines 72 that are parallel to the 45° line 70 are lines of equal disparity and thus equal range $Z_c$. For example the line 72 that is closest to line 70 represents a relatively small disparity, which is equivalent to a relatively great range, while the line 72 that is furthest from line 70 represents a relatively large disparity and hence a relatively short range. At some arbitrary value $I_x$, arrow 73 illustrates the magnitude of $D(I_x)$, and it should be noted that this magnitude is determined along a line that is perpendicular to the $I_A$ axis.

With continuing reference to FIGS. 2A-2C, in the foregoing discussion it has been assumed that peaks 36-40 correspond respectively to peaks 42-46. Based upon this assumption one could find the distances to the three previously-mentioned reflective regions to which the cameras are exposed directly from equation 1. Absent such assumptions it is necessary to determine the correspondence between the peaks electrically. Moreover in order to provide a range map for the entire surface of a target object, rather than the range to particular points on the surface, the more difficult problem of finding correspondence in the regions between the peaks must be addressed. This latter problem is exacerbated because, as will be apparent from the shifts illustrated in FIGS. 2A and 2B, for an arbitrary target object a linear transformation cannot be employed to map one waveform onto the other.

In range finding apparatus 10 the disparity function $D(I_A)$ is found by applying dynamic time warping to find the optimal transformation which maps the waveform of the signal from camera 14 onto the waveform of the signal from camera 12. As is known, the object of optimization, a mathematical field which arose from the calculus of variations, is to find a function which best maximizes or minimizes one or more criteria. A "cost functional" is selected to express the criteria of interest.

With continuing reference to FIG. 2C, it will be apparent that there are many possibilities for a function which would map $I_A$ onto $I_B$, with varying degrees of accuracy. To determine which of these possible solutions is best it is necessary to ascertain the factors that are physically important for an accurate fit. These factors can then be embodied in a cost functional which can be minimized to yield the best disparity function $D(I_A)$.

One measure of the success of a candidate for the disparity function $D(I_A)$ is how well the signal intensity, at an $I_A$ which has been mapped by the candidate function onto a corresponding $I_B$, matches the signal intensity at $I_B$. This consideration can be expressed mathematically as follows:

$$V_A(I_A) - V_B[I_A - D(I_A)] \quad (3)$$

Another relevant factor is how well the candidate for the disparity function maps the slope of the signal from one camera onto the slope of the signal from the other. This can be expressed mathematically as follows:

$$\frac{\partial}{\partial I_A} V_A(I_A) - \frac{\partial}{\partial I_B} V_B[I_A - D(I_A)] \quad (4)$$

Expression 4 compares the local derivatives of the respective camera intensities.

It may happen that, despite the criteria that are selected for determining how well a candidate for $D(I_A)$ fits the input data provided by the cameras, such criteria are met equally well by two or more candidates for $D(I_A)$. In order to avoid such ambiguity it is desirable to include a further criterion which permits a unique selection. Such a selection factor is provided by the disparity function $D(I_A)$ itself. Physically, this means that the disparity function which yields the greatest or least range will be selected (depending on the weight factor).

With the foregoing considerations in mind, range finding apparatus 10 employs the following cost functional J which, when minimized, leads to the desired disparity function $D(I_A)$, if a solution exists:

$$J = \sum_{I_s}^{I_f} \left\{ k_1(V_A(I_A) - V_B[I_A - D(I_A)])^2 + k_2 \left( \frac{\partial}{\partial I_A} V_A(I_A) - \frac{\partial}{\partial I_B} V_B[I_A - D(I_A)] \right)^2 + k_3[D(I_A)]^2 \right\} \quad (5)$$

In expression 5 the terms $k_1$, $k_2$, and $k_3$ are constants, which are determined emperically based upon the particular application to which apparatus 10 is dedicated. It will be apparent that the constant $k_1$, $k_2$, and $k_3$ are weight factors which numerically designate the relative importance of the criteria set forth above. One or even two of these constants may be selected to be zero.

Apparatus 10 preferably determines a range map for a single target object, rather than different objects which may be simultaneously in the field of view of the cameras 12 and 14. Accordingly, the summation is not over the entire common field of view of the cameras, but from a point $I_s$ (start) which identifies the beginning of an object to a point $I_f$ (finish) which identifies the end of the object. If a target object were suspended in space, for example, the start and finish points would be determined by where the disparity function becomes zero (i.e., at the 45° line 70 in FIG. 2C). On the other hand if the target object is supported by a platform (not illustrated) that is positioned at a known distance from the cameras A and B, the start and finish points would be determined by where $D(I_A)$ corresponds to the disparity at that known distance (unless the target object has a concave curve). Between these two end points the disparity function would correspond to a range that is less than the range of the support.

Terms corresponding to expressions 3, 4, and $D(I_A)$ are squared in equation 5 for two reasons. First, since the terms are squared the contribution from each expression is positive, thereby avoiding the possibility that a negative contribution from one expression would counterbalance a positive contribution from another. Moreover, squaring the terms effectively reduces the significance of a relatively small value for any of the terms and increases the significance of a relatively large value. If desired, however, the cost functional J could be made to converge on the solution in a linear manner by taking the absolute values rather than the squares of the expressions.

The cost functional J (equation 5) is repeatedly minimized for corresponding pairs of scanning lines of the cameras A and B. For example, the cost functional is employed on data corresponding to row $R_1$ of camera A and data corresponding to row $R_1$ of camera B in order to obtain a disparity function $D(I_A)$ for these data. The thus-found disparity function corresponds to the range taken along a line across the surface of the target object. Based upon the data from the next row of camera A and camera B, the cost functional J would again be minimized to provide a further disparity function corresponding to the range taken at a closely spaced, parallel line along the surface of the target object. This is repeated for all of the scanning lines of the cameras, thereby providing range information for the entire surface of the target object.

In practical applications it is necessary to resort to numerical techniques in order to minimize the cost functional J (equation 5). The numerical technique employed is preferably one known as dynamic programming, which finds wide application in the field of optimization. Since the cost functional J is minimized on a line-by-line basis in order to provide a $D(I_A)$ for each line, it will be apparent that the demands on computer 58 are considerable. These demands can be reduced by observing physical circumstances which make certain solutions impossible. Such physical considerations thus impose constraints on the disparity function $D(I_A)$ during minimization of the cost functional J.

Figure 3A:
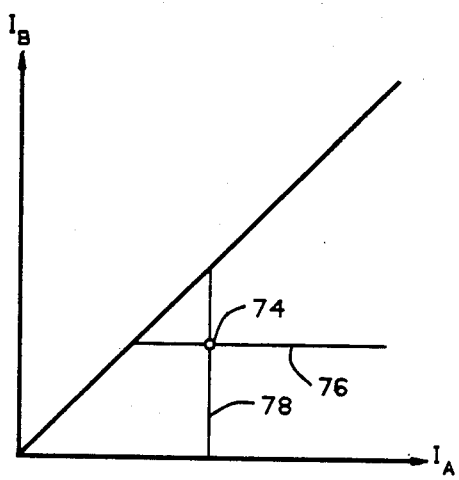
FIG. 3A graphically illustrates the line of sight constraint.

The most general constraint is the line-of-sight constraint, which is illustrated in FIG. 3A. If a point 74 is known to fall on the disparity function $D(I_A)$ for a corresponding pair of scanning lines, for that pair of scanning lines $D(I_A)$ cannot also have solutions on lines 76 and 78. The physical interpretation of the line-of-sight constraint can be appreciated from FIG. 1, if one considers only point 32 and ignores the rest of target body 22. If point 74 in FIG. 3A corresponds to point 32 in FIG. 1, target body 22 can have no points which lie in front of point 32 along either line 34 (since this would violate the assumption that point 74 lies on the disparity function) and, similarly, the cameras A and B cannot see any points which lie beyond point 32 along lines 34.

Figure 3B:
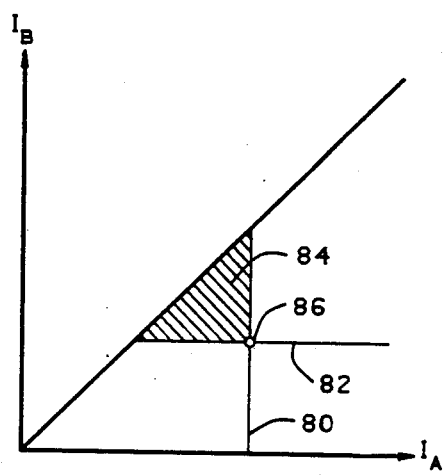
FIG. 3 graphically illustrates the convex surface constraint.

The line-of-sight constraint is a general constraint, and applies to a target object having an arbitrary shape. More powerful constraints can be imposed upon the solution if the target object is known to have a surface of a particular nature. For example FIG. 3B illustrates the convex surface constraint, wherein solutions are forbidden along lines 80 and 82 and in region 84 if the disparity function $D(I_A)$ is known to pass through point 86. The convex surface constraint, as is its name implies, applies to objects having surfaces that are convex.

Figure 4:
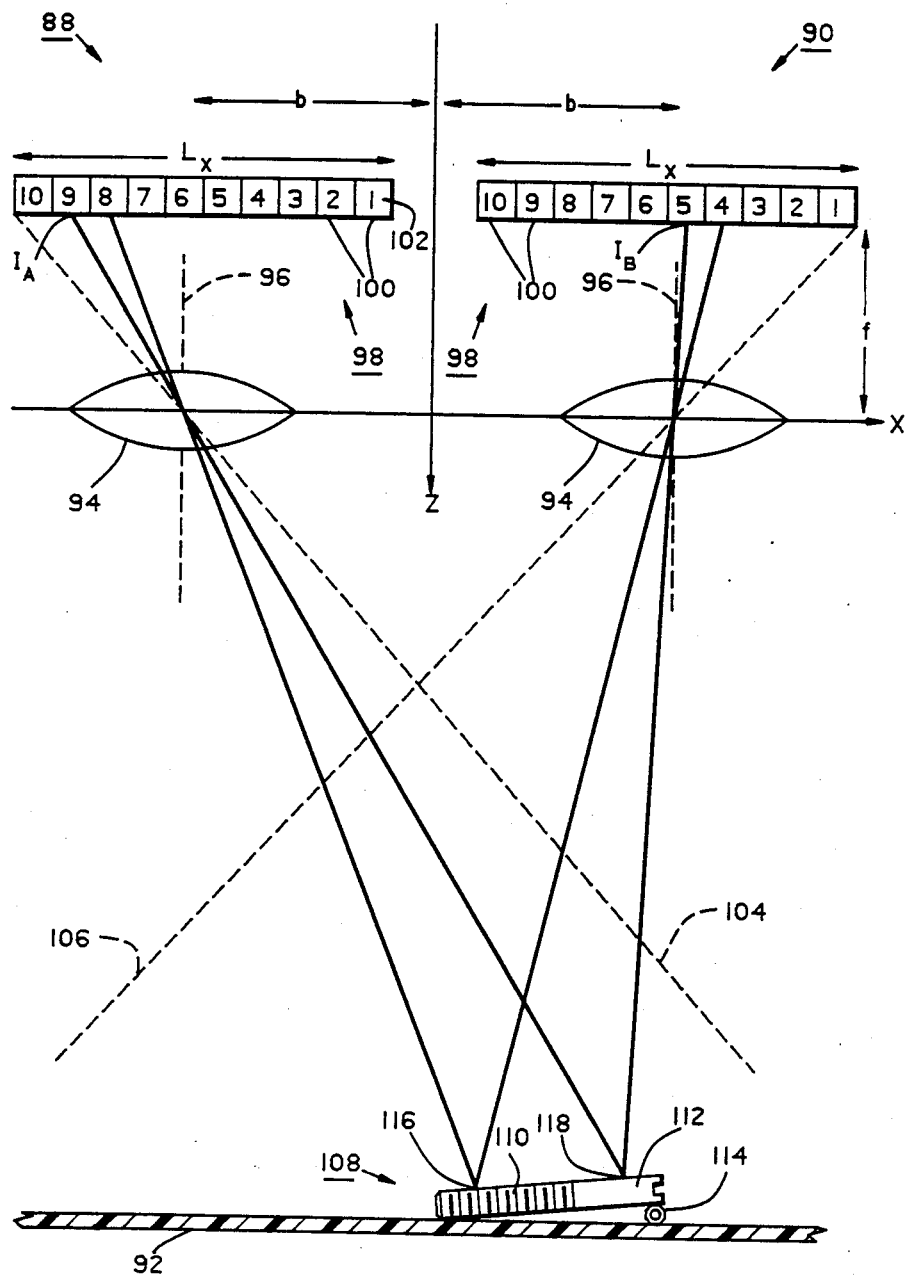
FIG. 4 schematically illustrates a simplified example of the optical portion of a range finding apparatus according to the present invention, and generally depicts two cameras which are employed to find the range of a bolt.

Before proceeding further it is appropriate to consider a concrete but simple embodiment of the range finding apparatus of the present invention. In FIG. 4 cameras 88 and 90 are directed toward a conveyor belt 92 which transports objects to be grasped by an industrial robot (not illustrated). Each of cameras 88 and 90 includes a lens 94 having an optical axis 96 and a sensor 98 having light sensitive regions 100 that are disposed in ten columns. In FIG. 4 the regions 100 have a width of one unit, so that in Equation 1 the length $L_X$ of each sensor is ten units. The sensors 98 are separated by a center-to-center distance of eighteen units, so that b is equal to nine units. The lenses 94 have a focal length f of five units.

In FIG. 4 the values $I_A$ and $I_B$ are integers which identify which column of light sensitive regions 100 a beam falls in. In camera 88, for example, $I_A$ is equal to one for light that impinges against sensor 98 at a position that is greater than zero units from end 102 but less than one unit; $I_A$ is equal to two for light that impinges at a distance greater than one unit from end 102 but less than two units; etc.

With continuing reference to FIG. 4, the active ranging zone of cameras 88 and 90 lies between dotted lines 104 and 106, since a target object which lies outside this region would not be sensed by both cameras.

In FIG. 4 the target object is a bolt 108 having a threaded region 110 and an unthreaded region 112. One end of bolt 108 rests upon a nut 114, which is hidden from cameras 88 and 90. With the values set forth above one can calculate the range $Z_c$ at points 116 and 118 directly from equation 1, as follows:

$$Z_c = \frac{2bfI_{max}/L_x}{I_A - I_B} = \frac{90}{I_A - I_B}$$

Since the disparity $I_A$ minus $I_B$ at point 116 is eight minus four equals four, the range $Z_c$ at that point is 22.5 units. Due to the limited resolution of the sensors 98 in this example (that is, $I_{max}$ equals ten), the disparity at point 118 (e.g., nine minus five) is the same as at point 116; greater resolution by sensors 98 would be needed in order to detect a different range for point 118.

Figure 5A:
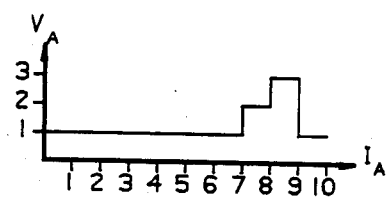
FIGS. 5A and 5B are graphs illustrating signals from the cameras of FIG. 4.
Figure 5B:
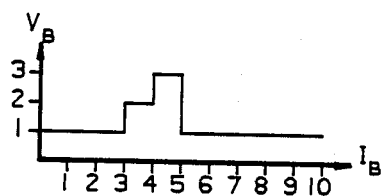
Figure 5C:
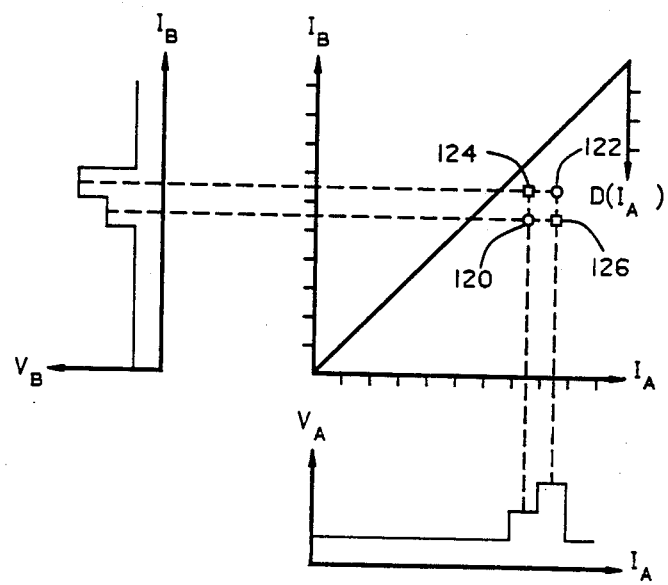
FIG. 5C graphically represents the mapping of one of the signals of FIGS. 5A and 5B onto the other signals.

For purposes of illustration assume that light sensitive regions 100 provide outputs in increments of one volt, and that the output is one volt when a region 100 is illuminated by light reflected from belt 92, the output is two volts when a region 100 is illuminated by light reflected from threaded region 110, and the output is three volts when a region 100 is illuminated by light reflected from unthreaded region 112. The output for one scanning line of camera 88 is illustrated FIG. 5A and the output for the corresponding scanning line of camera 90 is illustrated in FIG. 5B. In FIG. 5C the vertical projections from the signal of camera 88 (FIG. 5A) intersect the horizontal projections from the signal of camera 90 (FIG. 5B) at circles 120 and 122. Accordingly, these circles lie upon the disparity function for the example of FIG. 4. In FIG. 5C, the axes are marked at one unit intervals.

FIG. 5C was constructed based upon the knowledge, from FIG. 4, that $I_A=8$ corresponds to $I_B=4$ for point 116 and $I_A=9$ and $I_B=5$ for point 118. Without this knowledge, the signals of FIGS. 5A and 5B might lead to the erroneous results marked by boxes 124 and 126 in FIG. 5C. In fact, from FIG. 5C it will be apparent that for every value of $I_A$ there is a range of potential values which could be selected for $I_B$. It is by minimizing the cost functional J (equation 5) that one selects the disparity function $D(I_A)$ that best fits the data.

To continue with the example in FIG. 4, assume that $k_1=1$ in the cost functional J and that $k_2=k_3=0$. This leads to the simplified cost functional J', as follows:

$$J' = \Sigma\{V_A(I_A) - V_B[I_A - D(I_A)]\}^2 \qquad (7)$$

When $I_A = 8$, the disparity $D(I_A)$ might range from zero to 7, as indicated in Table I:

TABLE I

| $I_A$ | $V_A$ | $D(I_A)$ | $I_A - D(I_A)$ ($= I_B$) | $V_B[I_A - D(I_A)]$ |
|---|---|---|---|---|
| 8 | 2 | 0 | 8 | 1 |
|   |   | 1 | 7 | 1 |
|   |   | 2 | 6 | 1 |
|   |   | 3 | 5 | 3 |
|   |   | 4 | 4 | 2 |
|   |   | 5 | 3 | 1 |
|   |   | 6 | 2 | 1 |
|   |   | 7 | 1 | 1 |

From Table I it will be apparent that $D(I_A) = 4$ is the choice which best satisfies the cost functional J' at $I_A = 8$. Similarily, Table II illustrates the possible selections for $D(I_A)$ at $I_A = 9$.

TABLE 2

| $I_A$ | $V_A$ | $D(I_A)$ | $I_A - D(I_A)$ ($= I_B$) | $V_B[I_A - D(I_A)]$ |
|---|---|---|---|---|
| 9 | 3 | 0 | 9 | 1 |
|   |   | 1 | 8 | 1 |
|   |   | 2 | 7 | 1 |
|   |   | 3 | 6 | 1 |
|   |   | 4 | 5 | 3 |
|   |   | 5 | 4 | 2 |
|   |   | 6 | 3 | 1 |
|   |   | 7 | 2 | 1 |
|   |   | 8 | 1 | 1 |

It will be apparent from Table 2 that $D(I_A) = 4$ minimizes the cost functional J' at $I_A = 9$.

Figure 6A:
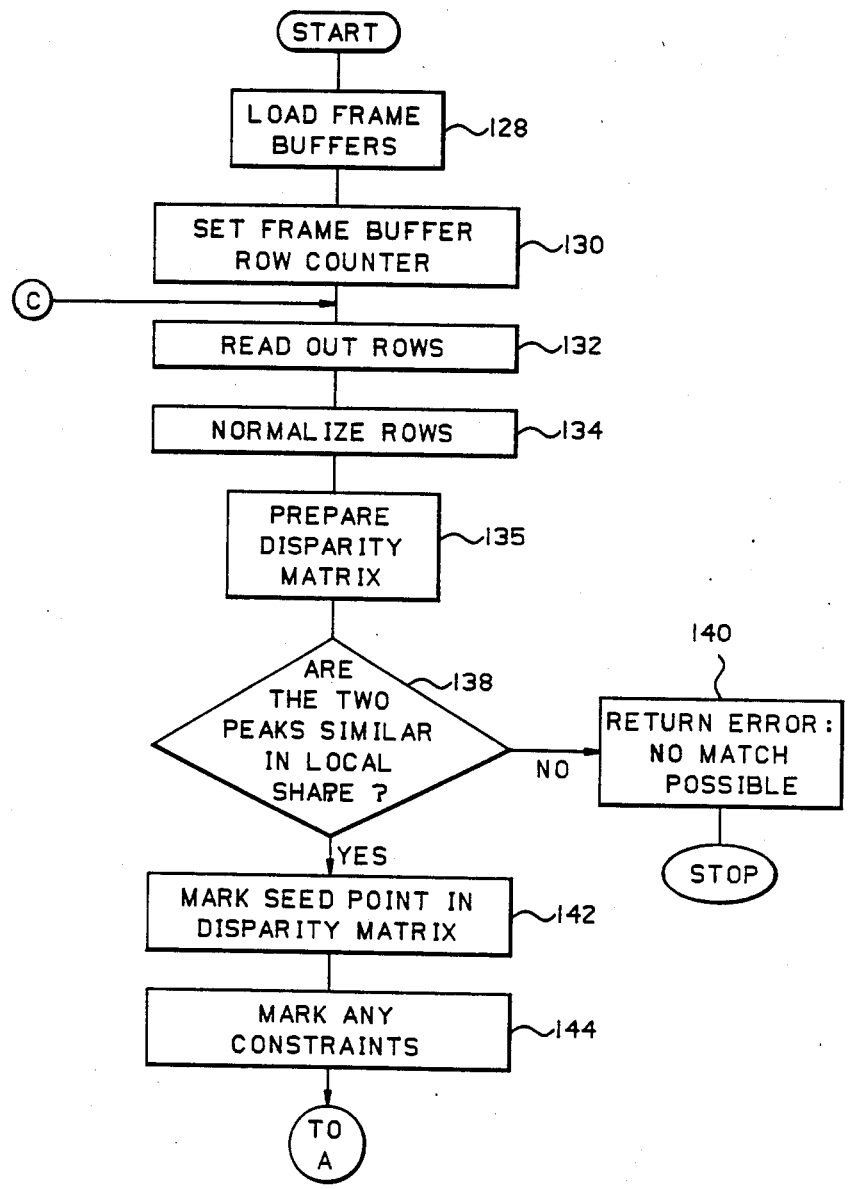
FIGS. 6A, 6B, and 6C are a flow chart for operation of the computer of FIG. 1.
Figure 6B:
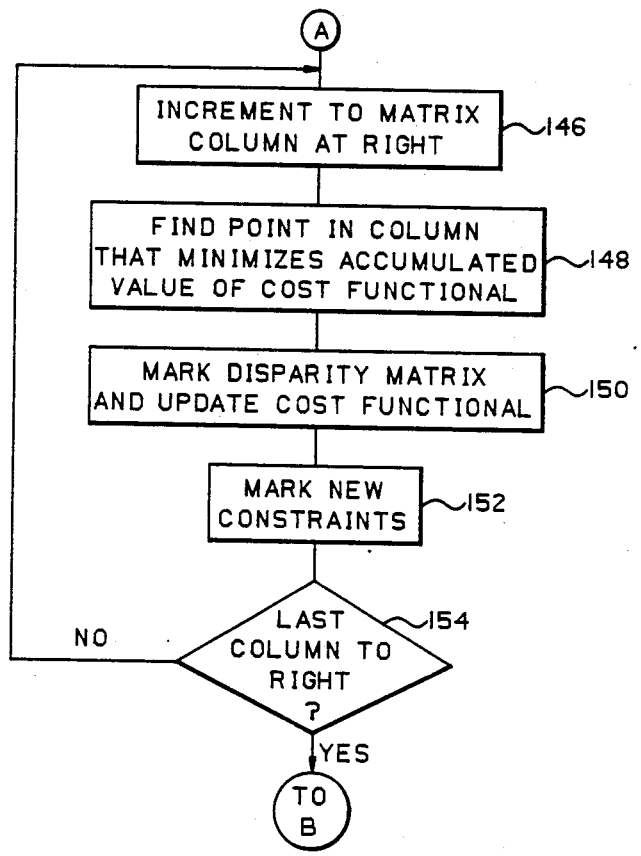
Figure 6C:
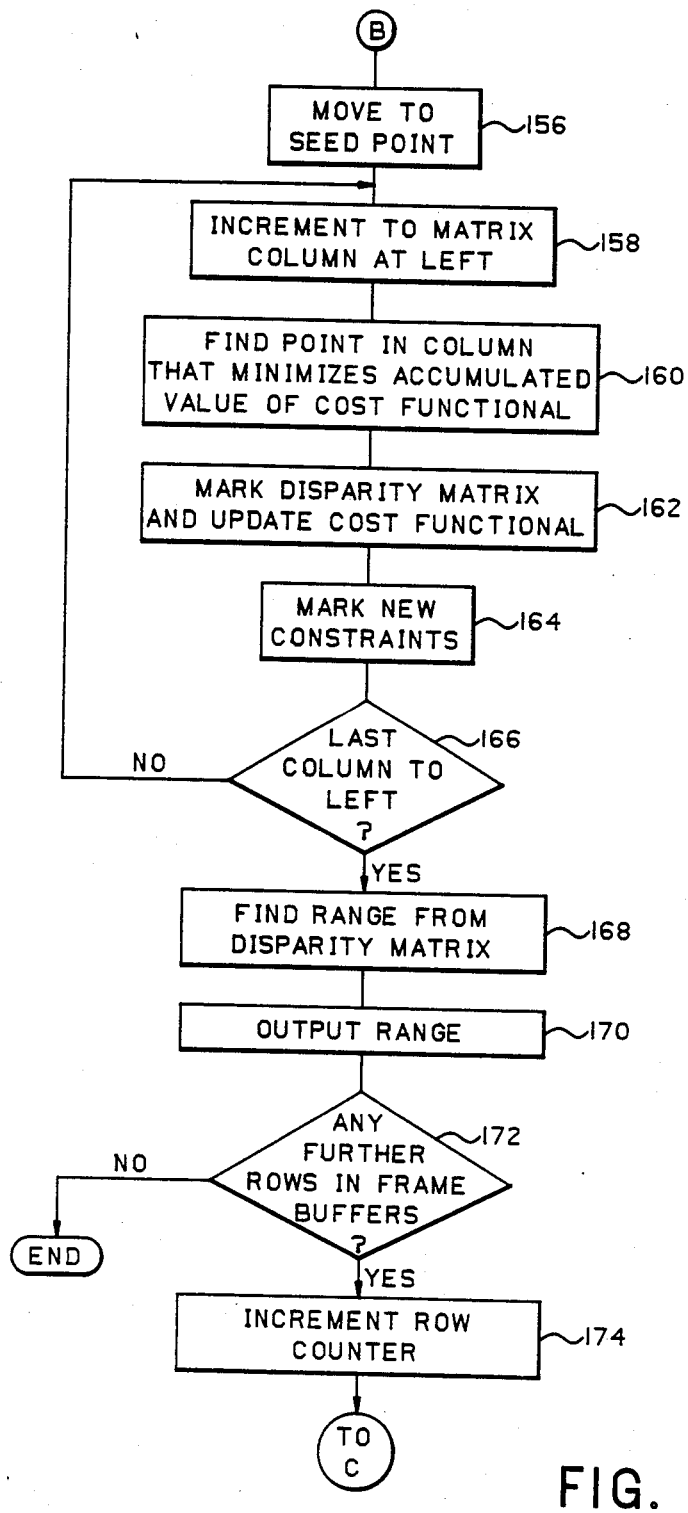
Figure 7:
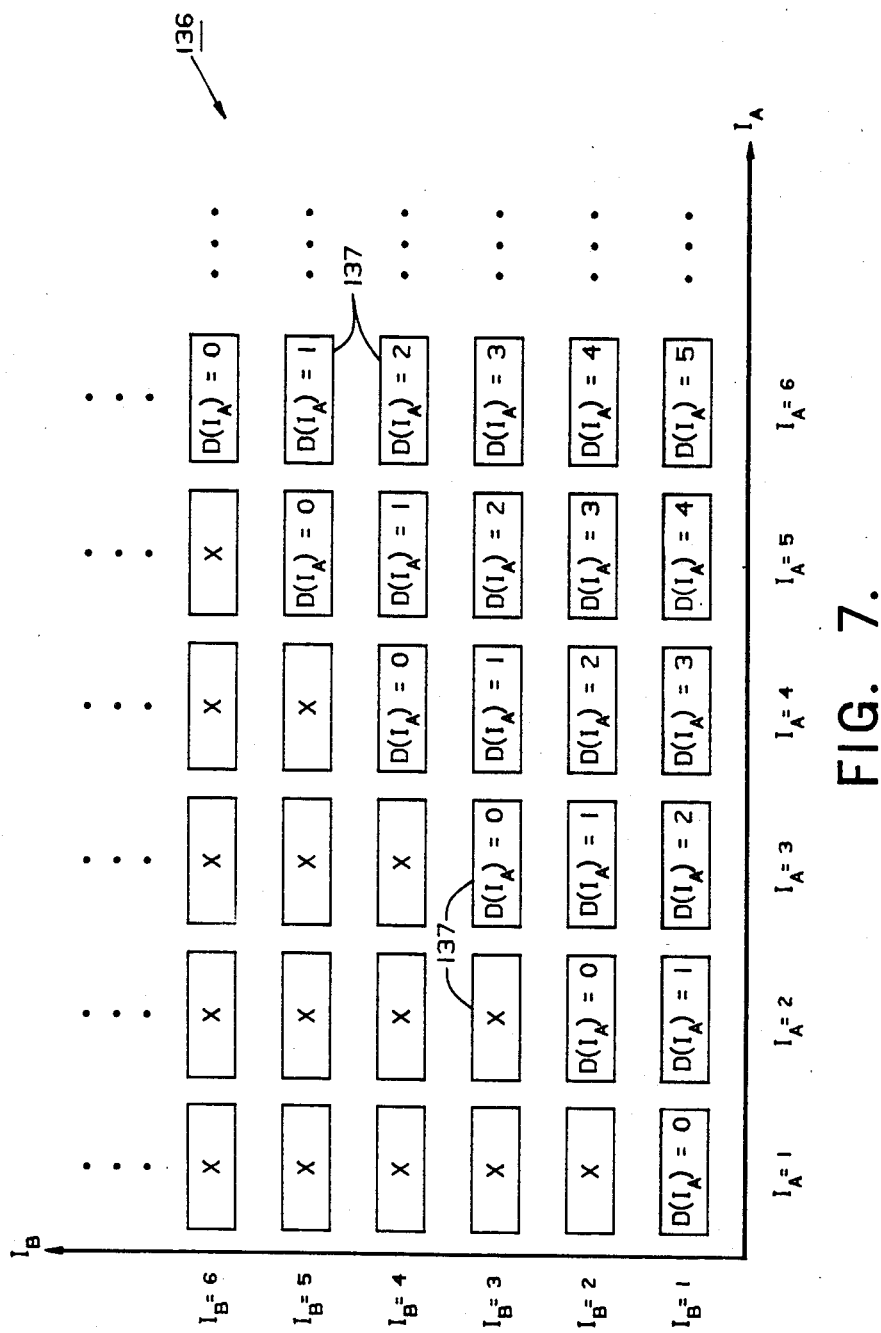
FIG. 7 schematically illustrates a disparity matrix in memory.

FIGS. 6A, 6B, and 6C illustrate a program for use by computer 58 of range finding apparatus 10. The initial step, at block 128, is to load a frame (that is, signals for the regions 30 at each columns $C_1 \ldots C_{max}$ for each row $R_1$ through $R_{max}$) of digitalized video data from camera A into frame buffer 52, and to load a frame of digitalized video data from camera B into frame buffer 54. A frame buffer row counter (not illustrated) in memory 56 is then set to one in block 130. Thereafter, at block 132, the first row is read out of frame buffer 52 and the first row is read out of frame buffer 54. In block 134 the peak intensity value in each row is determined, and the remaining intensity values are normalized to this peak. In block 135 a disparity matrix is created in memory 56, the disparity matrix having a plurality of positions for each $I_A$, each of these positions corresponding to a possible value for the disparity at that $I_A$ and thus a possible value for $I_B$. The disparity matrix basically corresponds to the portion of FIG. 2C lying between the 45° line 70 and the $I_A$ axis. A disparity matrix 136 is schematically illustrated in FIG. 7, which depicts a plurality of memory locations 137. Each location 137 has an address which corresponds to a column for $I_A$ and a possible value of $I_B$. From equation 2, each $I_A$ and $I_B$ yield a value for $D(I_A)$, so a column at an $I_A$ provides possible values for the disparity at that $I_A$. For the sake of illustration it will be assumed that the value stored at each memory location 137 may be either zero, plus one, or minus one. Since the memory locations 137 that are marked "X" in FIG. 7 represent a range $Z_c$ greater than infinity, these memory locations need not be present in memory 56. Returning to FIG. 6, disparity matrix is initialized at block 135 by setting all values to zero. As will become apparent, a zero in a particular position in the disparity matrix indicates that the disparity function does not pass through that position.

In block 138 the regions immediately adjacent the peaks identified in block 134 are examined to see if the peaks are similar in local shape. If not, the views from the two cameras are so dissimilar that they cannot be matched. An error is returned at block 140 and the routine is stopped. However assuming that the peaks are sufficiently similar in local shape, at block 152 the disparity matrix is marked plus one at the $I_A$ and $I_B$ corresponding to the peaks. This point is deemed the "seed point," and any candidate for the disparity function must pass through the seed point. The seed point having been selected, at block 144 constraint points for the seed point are marked minus one the disparity matrix. For example if point 74 is the seed point in FIG. 3A, minus one would be marked along lines 76 and 78 in view of the line-of-sight constraint. After the applicable constraints are marked, at block 146 the column in the disparity matrix immediately to the right of the column which contains the seed point is determined. This corresponds to incrementing the value $I_f$ in equation 5. For this new column, in block 148 a point in the disparity matrix is selected which minimizes the accumulated value of the cost functional J without violating any of the previously-marked constraints. In block 150 the column is marked plus one at this point, and the value of the cost functional J is updated. Line-of-sight and any other applicable constraints are marked minus one on the disparity matrix for the newly determined point on the disparity function (block 152), and then a check is made at block 154 to determine whether all columns to the right of the seed point that need to be checked have indeed been checked. Depending upon the particular application one has the option of either exhausting the disparity matrix or stopping when the disparity reaches a predetermined value (such as, for example, zero) corresponding to the edge of the target object. If columns remain to be checked the value for $I_f$ is incremented at block 146, a new point in the disparity matrix is marked at blocks 148 and 150, etc.

When all the necessary columns of the disparity matrix to the right of the seed point have been marked, thus establishing the disparity function $D(I_A)$ in this region, the same procedures are repeated to the left. At block 156 a column counter (not illustrated) returns to the seed point, and at block 158 the value $I_s$ is incremented to move to the first column in the disparity matrix at the left of the seed point. In block 160 a point in this column is selected which satisfies all previously-marked constraints and minimizes the accumulated value of the cost functional J. This value is a solution point which is marked plus one at block 162, and the cost functional J is updated. New constraints are marked minus one at block 164, and in block 166 a check is made to determine whether all the columns to the left that need to be checked have been checked. If not the column counter is incremented at block 158 and a further point on the disparity function $D(I_A)$ is determined. After the last column the range is determined (block 168), the range $Z_c$ for each point marked plus one in the disparity matrix is determined from equation 1 (block 168). These range values are provided, at block 170, to an output device such as the chart recorder 62 in FIG. 1, an industrial robot, etc. Thereafter a check is made at block 172 to determine whether any further corresponding rows remain in frame counters 52 and 54.

If so the row counter is incremented at block 174 and program control returns to block 134 so that the disparity function $D(I_A)$ for the next scanning lines of the cameras 12 and 14 can be determined.

It will be understood that the above description of the present invention is susceptible to various modifications, changes, and adaptations, and the same are intended to be comprehended within the meaning and range of equivalents of the appended claims.

I claim:

1. A method for finding the range of a target object, comprising the steps of:
   (a) viewing the target object from a first perspective, using a camera having a sensor with light-sensitive regions that are disposed in a row having ends, to provide a signal $V_A(I_A)$ corresponding to the first perspective, where $V_A$ is a voltage proportional to light intensity at a light-sensitive region of the row and $I_A$ is an integer corresponding to the distance between the respective light-sensitive region and a predetermined end of the row;
   (b) viewing the target object from a second perspective, using a camera having a sensor with light-sensitive regions that are disposed in a row having ends, to provide a signal $V_B(I_B)$ corresponding to the second perspective, where $V_B$ is a voltage proportional to light intensity at a light-sensitive region of the row and $I_B$ is an integer corresponding to the distance between the respective light-sensitive region and a predetermined end of the row;
   (c) finding a disparity function $D(I_A)$ which maps $V_A(I_A)$ onto $V_B(I_B)$ for every $I_A$ in an interval, the interval including a plurality of consecutive integers;
   (d) using the disparity function $D(I_A)$ to determine the range of the target object at a plurality of points on the target object; and
   (e) providing electrical signals corresponding to the range to an output device.

2. The method of claim 1, wherein step (c) comprises:
   (f) establishing a disparity matrix in a memory, the disparity matrix having rows corresponding to different values of $I_B$ and columns corresponding to different values of $I_A$;
   (g) finding a peak in $V_A(I_A)$ and a matching peak in $V_B(I_B)$;
   (h) marking the disparity matrix at a row and column corresponding to the $I_B$ and $I_A$, respectively, of the peaks in step (g);
   (i) finding an unmarked column in the disparity matrix where $I_A$ differs by one from the column that was marked in the previous step;
   (j) marking the disparity matrix, in the column found in step (i), at an $I_B$ that lies on the disparity function $D(I_A)$;
   (k) repeating steps (i) and (j) a plurality of times.

3. The method of claim 2, wherein step (j) comprises finding a relative extremum of a cost functional.

4. The method of claim 2, wherein step (j) comprises minimizing a cost functional having a term that is a function of the difference between $V_A(I_A)$ and $V_B[I_A - D(I_A)]$.

5. The method of claim 2, wherein step (j) comprises minimizing a cost functional having a term that is a function of the difference between a derivative of $V_A(I_A)$ and a derivative of $V_B[I_A - D(I_A)]$.

6. The method of claim 2, wherein step (j) comprises minimizing a cost functional having a term that is a function of $D(I_A)$.

7. The method of claim 2, wherein step (j) comprises minimizing a cost functional having a term that is a function of the difference between $V_A(I_A)$ and $V_B[I_A - D(I_A)]$, and term that is a function of the difference between a derivative of $V_A(I_A)$ and a derivative of $V_B[I_A - D(I_A)]$.

8. The method of claim 2, wherein step (j) comprises minimizing a cost functional having a term that is a function of the difference between $V_A(I_A)$ and $V_B[I_A - D(I_A)]$, a term that is a function of the difference between a derivative of $V_A(I_A)$ and a derivative of $V[I_A - D(I_A)]$, and a term that is a function of $D(I_A)$.

9. The method of claim 8, wherein the cost functional is $$J = \sum_{I_s}^{I_f} \left\{ k_1(V_A(I_A) - V_B[I_A - D(I_A)])^2 + k_2\left(\frac{\partial}{\partial I_A} V_A(I_A) - \frac{\partial}{\partial I_B} V_B[I_A - D(I_A)]\right)^2 + k_3[D(I_A)]^2 \right\}$$

where $k_1$, $k_2$, and $k_3$ are constants.

10. The method of claim 8, further comprising the step of marking the disparity matrix with constraints after step (h) and marking the disparity matrix with constraints after each repetition of step (i).

11. The method of claim 10, wherein the constraints include a line-of-sight constraint.

12. The method of claim 10, wherein the constraints include a convex surface constraint.

13. The method of claim 8, wherein step (a) is conducted using a first camera having a first sensor with light sensitive regions that are disposed in a plurality of first rows, wherein step (b) is conducted using a second camera having a second sensor with light sensitive regions that are disposed in a plurality of second rows, and further comprising the step of repeating steps (f) through (k) for a plurality of first and second rows.

14. The method of claim 2, wherein step (a) is conducted using a first camera having a first sensor with light sensitive regions that are disposed in a plurality of first rows, wherein step (b) is conducted using a second camera having a second sensor with light sensitive regions that are disposed in a plurality of second rows, and further comprising the step of repeating steps (f) through (k) for a plurality of first and second rows.

15. The method of claim 2, further comprising the step of marking the disparity matrix with constraints after step (h) and marking the disparity matrix with constraints after each repetition of step (i).

16. The method of claim 1, wherein step (a) is conducted using a first camera having a first sensor with light sensitive regions that are disposed in a first row, wherein step (b) is conducted using a second camera having a second sensor with light sensitive regions that are disposed in a second row, wherein the first and second cameras are identical and further include lens means for focusing light on the respective sensor, the sensors being disposed in a plane, and wherein step (d) comprises the step of solving, for a plurality of $I_A$, the equation $$Z_c = \frac{2bfI_{max}/L_x}{D(I_A)}$$

where $Z_c$ is the range, b is half the center-to-center distance between the sensors, f is the focal length of the lens means, $I_{max}$ is the number of light sensitive regions in a row, and $L_x$ is the distance between the ends of a row.

17. The method of claim 16, wherein step (c) comprises finding the relative extremum of a cost functional having a term that is a function of the difference between $V_A(I_A)$ and $V_B[I_A-D(I_A)]$, and having a term that is a function of the difference between a derivative of $V_A(I_A)$ and a derivative of $V_B[I_A-D(I_A)]$.

18. The method of claim 1, wherein step (c) comprises finding the relative extremum of a cost functional having a term that is a function of the difference between $V_A(I_A)$ and $V_B[I_A-D(I_A)]$, and having a term that is a function of the difference between a derivative of $V_A(I_A)$ and a derivative of $V_B[I_A-D(I_A0]$.

19. An apparatus for finding the range of a target object, comprising:

a first camera directed toward the target object to view the target object from a first perspective, the first camera having a first sensor with light-sensitive regions that are disposed in a first row having ends, the first camera providing a signal $V_A(I_A)$, where $V_A$ is a voltage proportional to light intensity at a light-sensitive region of the first row and $I_A$ is an integer corresponding to the distance between the respective light-sensitive region and a predetermined end of the first row;

a second camera directed toward the target object to view the target object from a second perspective, the second camera having a second sensor with light-sensitive regions that are disposed in a second row having ends, the second camera providing a signal $V_B(I_B)$, where $V_B$ is a voltage proportional to light intensity at a light-sensitive region of the second row and $I_B$ is an integer corresponding to the distance between the respective light-sensitive region and a predetermined end of the second row; and means for finding a disparity function $D(I_A)$ which maps $V_A(I_A)$ onto $V_B(I_B)$ for every $I_A$ in an interval, the interval including a plurality of consecutive integers, and for using the disparity function $D(I_A)$ to determine the range of the target object at a plurality of points on the target object.

20. The apparatus of claim 19, wherein said means for finding comprises a memory and means for establishing a disparity matrix in the memory, the disparity matrix having rows corresponding to different values of $I_B$ and columns corresponding to different values of $I_A$.

* * * * *